United States Patent [19]

Kolze

[11] 4,270,570
[45] Jun. 2, 1981

[54] VALVE ASSEMBLY
[75] Inventor: Lawrence A. Kolze, Bensenville, Ill.
[73] Assignee: Eaton Corporation, Cleveland, Ohio
[21] Appl. No.: 84,957
[22] Filed: Oct. 15, 1979
[51] Int. Cl.³ .............................................. F16K 19/00
[52] U.S. Cl. ..................................... 137/597; 137/606
[58] Field of Search ........................... 4/192, 193, 194; 137/597, 606, 607

[56] References Cited
U.S. PATENT DOCUMENTS

| 2,542,279 | 2/1951 | Kempton | 137/606 |
|---|---|---|---|
| 3,053,277 | 9/1962 | Bahrani | 137/597 |
| 3,672,627 | 6/1972 | McCarty | 251/30 |

Primary Examiner—Robert G. Nilson
Attorney, Agent, or Firm—R. J. McCloskey; R. A. Johnston

[57] ABSTRACT

A mixing and flow control valve assembly (10) for water inlet to domestic appliances having individual solenoid operated inlet valves (30,32) for connection to heated and unheated fluid sources. The individual actuated inlet valves discharge to a common inlet (40) of a solenoid operated (34) flow control valve which in the deenergized state provides a high rate of discharge to one outlet (28) and in the energized state diverts flow to a substantially lower rate of discharge outlet (24). The valve assembly employs only three solenoid operators (30, 32, 34) which are mounted integrally in a common valve body.

5 Claims, 3 Drawing Figures

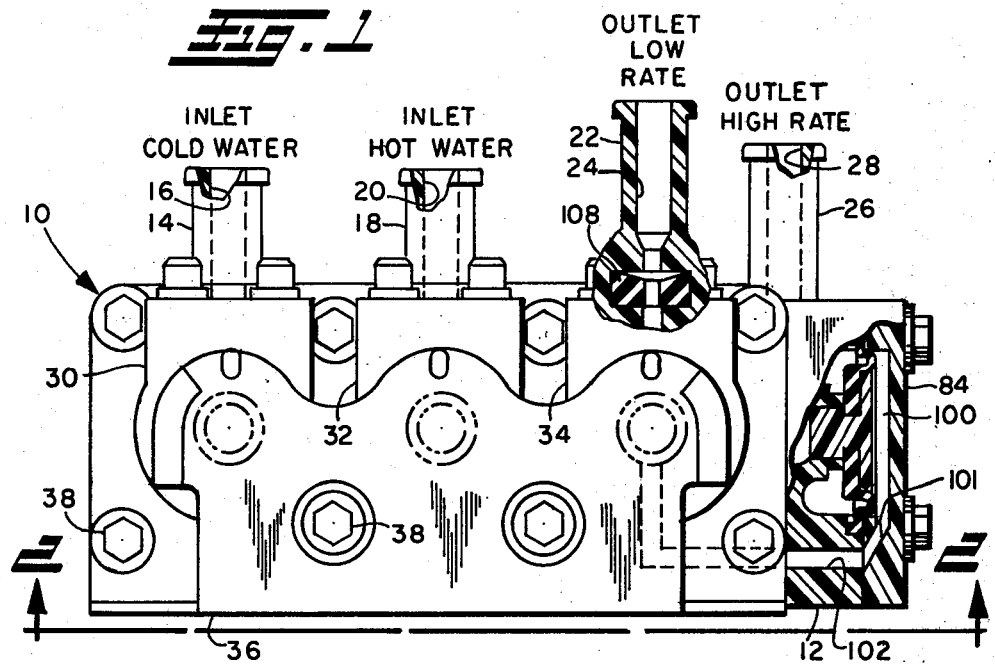
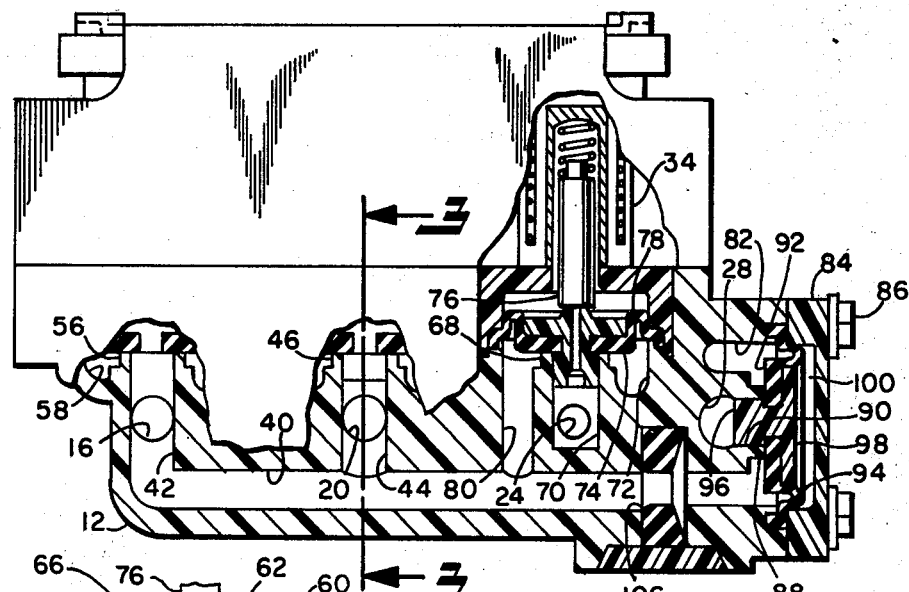
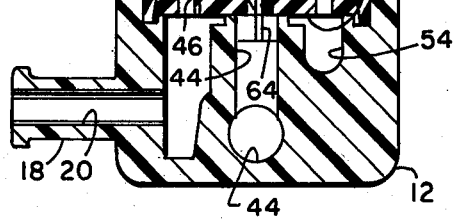

VALVE ASSEMBLY

BACKGROUND OF THE INVENTION

The present invention relates to power operated mixing and flow control valves. Valves of this type are employed where it is desired to mix fluid from a heated and unheated source to produce a fluid mixture of preselected temperature and to control the discharge rate of the mixed fluid. In particular, power operated valves of this type are employed in domestic laundry appliances to control the filling of the fluid in the tub, particularly those of the type having a tub with a motor driven agitator. In the typical household washing machine a power operated valve has attached to one inlet thereof the household cold water line and to a second inlet thereof the line from the hot water heater. Upon energization from the washing machine program timer, the power operated valve assembly admits either cold or hot or a mixture of the hot and cold water to the washing machine tub.

In certain appliance operating programs it is desired to provide for a initially higher flow rate during a portion of the program, followed by a substantially lower flow rate during other portions of the program, and to provide for changing the flow rate during the program independently of the mixing control of the incoming hot and cold water. Although it has been proposed to use separate, individual power operated valves fluidically in parallel with the mixing valve, such an arrangement is prohibitively costly from a manufacturing standpoint. It is also power-consuming, in that a plurality of valves must be operated at a given time to provide the desired temperature and flow rate of the incoming fluid.

Thus it has been desired to provide a power operated valve assembly which provides control for mixing separate incoming streams of hot and cold water and to provide a plurality of discharge rates for the fluid mixture in a compact simple and easy to manufacture arrangement which consumes a minimum of power during the various modes of operation.

SUMMARY OF THE INVENTION

The present invention provides a unique power operated valve assembly having one inlet adapted for connection to a source of heated fluid and a second inlet adapted for connection to a source of unheated fluid as, for example, separate hot and cold household water lines. The valve assembly of the present invention provides a solution to the above-described problem of providing for plural controlled flow rates of the mixture of the inlet streams upon energization by a command signal. The valve assembly of the present invention employs only three individual power actuators for the mixing and discharge flow rate control functions and the actuators and valves are contained in a unitary housing arrangement.

The present valve assembly employs individual power actuators for respectively the first and second water inlets and provides for a relatively high rate of flow discharge to a first discharge outlet in the absence of any command signal to the third power operator. Upon energization of the third power operator by a command signal, the discharge flow is discharged through a second outlet at a substantially lower rate than through the first outlet. The valve assembly of the present invention thus requires only energization of at least one of the inlet valve operators to provide for a high rate of flow discharge. The present invention thus provides a unique solution to the above-described problem wherein a valve assembly with only three power operators provides for mixing control of incoming hot and cold water and also provides for an initial high rate of flow discharge at a first outlet and upon command changes to a lesser flow rate discharge at a second outlet. The present valve combines all valves and power operators in a single housing and thus is compact and light in weight and further provides for a minimum power consumption while providing the desired flexiblity of mixing and flow control.

BRIEF DESCRIPTION OF THE DRAWINGS

FIG. 1 is a top view of the valve assembly of the present invention illustrating the arrangement of the power operators; and FIG. 2 is an elevation view taken along indicating lines 2—2 of FIG. 1 with portions of the housing broken away to show the valve seat the movable valve members within the valve assembly.

FIG. 3 is a partial section view taken along section indicating lines 3—3 of FIG. 2.

DETAILED DESCRIPTION

The valve assembly indicated generally at 10 has a body 12 formed preferably of molded plastic material suitable for hot water service. The body 12 has molded integrally therewith a first inlet nipple 14 having a fluid port 16 provided therethrough and a second inlet nipple 18 having a fluid inlet port 20 formed therein, the second inlet nipple 18 being spaced from the first inlet nipple 14 by an amount sufficient to permit easy hose attachment thereto. A first low rate outlet nipple 22 is provided having low rate fluid port 24 extending therethrough, nipple 22 being spaced from the respective inlet nipples. A second high rate outlet nipple 26 is provided and extends from the valve housing in spaced relationship to the low rate outlet 22 and has an outlet port 28 provided therethrough.

A first power actuator 30 is mounted atop the block 12 and is stationed thereon coincident with the first inlet nipple 14. A second power actuator 32 is similarly mounted atop body 12 and is stationed therealong coincident with the second inlet nipple 18, the actuators 30 and 32 being operably connected, as will hereinafter be described, for individual actuation of valves associated with the respective inlet ports. In the presently preferred practice of the invention the power actuators 30 and 32 comprise electomagnetically operated solenoids. A third power actuator 34 is also mounted atop block 12 and stationed therealong coincident with the low rate discharge nipple 22 and is operatively connected to valve means for controlling the flow through port 24, as will hereinafter be described. The solenoid operators 30, 32 and 34 are retained on the body 12 by a bracket 36 and secured to the body 12 by suitable expedients as, for example, a plurality of self-tapping screws 38.

Referring now to FIG. 2, the body has formed therein a mixing chamber or passage 40 which communicates with vertical inlet passages 42 and 44 for the cold and hot water respectively.

Referring to FIG. 3, the mixing chamber 40 is shown as typically communicating with the vertical inlet passage 44 which terminates in its upward extremity in a valve seat 46 which has seated thereon a movable valve member 48. In the presently preferred practice of the invention the movable valve member 48 comprises the stiffened center portion of a circular diaphragm 50 which is sealed at its outer periphery by annular cover member 52.

An annular chamber 54 is formed in the body 12 about the valve seat 46 and the annular chamber 54 communicates directly with the inlet port 20.

It will be understood that the arrangement for the valve seat 56 which in turn communicates with cold inlet port 16, is similar to the diaphragm-valve seat arrangement for port 20 shown in FIG. 3 and a separate detail illustration for valve seat 56 and its associated valve has been omitted for brevity.

In the presently preferred practice the valve member 48 for valve seat 46 has received centrally therethrough an insert 60 which has a pilot valve seat 62 and a pilot valve hole 64 centrally therethrough communicating with the vertical passage 44. A pilot valve member 66 rests against the pilot valve seat 62 and in the presently preferred practice the pilot valve member is the end of the movable armature of the solenoid operator 32. The operation of solenoid actuated pilot operated water valves is well known in the art as, for example, those described in U.S. Pat. Nos. 3,593,956, 3,593,957, and 3,672,627.

Referring now to FIG. 2, the low rate outlet port 24 communicates with annular valve seat 68 via vertical passage 70. The valve seat 68 is surrounded by a pilot operated valve member 74 movably disposed thereagainst. The operation of the pilot operated valve member 74 is similar to that described with respect to FIG. 3 and employs the solenoid armature 76 as the pilot valve member in the same manner as the operator described with respect to FIG. 3. The valve member 74 forms the central region of pressure responsive diaphragm 78 which is sealed at its outer periphery about annular chamber 72. The annular chamber 72 communicates with mixing passage 40 via the vertical passageway 80.

In operation, energization of either power operator solenoid 30 or 32 admits fluid from the respective ports 16, 20 over either or both of the respective valve seats 56, 46 and through the respective vertical passages 42, 44 and into the mixing chamber 40. It will be understood that the choice of which of the valve seats 56, 46 are opened determines the temperature of the fluid in the mixing chamber 40. If the valve member 74 is seated against valve seat 68 flow through the vertical passage 80 and annular chamber 72 is prevented from flowing over valve seat 68 and no flow is permitted to the low flow rate outlet port 24.

Referring again to FIG. 2, the righthand end of mixing passage 40 communicates with an annular chamber 82 formed adjacent the righthand end of body 12 which chamber is covered by an end cap 84 retained thereover by a suitable expedient as, for example, self-tapping screws 86. The annular chamber 82 has at its inner periphery an annular valve seat 88 which is similar to the valve seat 68, 46 and 56 provided for the inlet ports and the low rate outlet port. The annular valve seat 88 has the inner periphery thereof forming a passage 90 which communicates with high rate outlet port 28.

A movable valve member 92 is provided and in the presently preferred practice comprises the central region of a flexible diaphragm 94 similar to the arrangement for valve seat 56, 46 and 68. However, the valve member 92 has a guide member 96 received centrally therethrough with portions of the guide member providing a backing plate 98 for the central region of the valve member. In the presently preferred practice the guide member 96 does not have a pilot valve hole therethrough since valve member 92 is not power operated. The diaphragm 94 is sealed about its outer periphery by end cap 84 and thus provides a pressure bias chamber 100 between the diaphragm and end cap 84.

Referring again to FIG. 1, a bypass passage 102 is provided in the body and communicates with a corresponding bypass passage 101 in the end cap 84, which passage 101 communicates with the chamber 100. Passage 102 in the body communicates with vertical passage 70 and the low rate outlet port 24 as shown in dashed outline in FIG. 1.

In operation, with valve member 74 seated on valve seat 68 flow through low rate outlet port 24 is blocked and passage 102 vents pressure bias chamber 100 to the unpressurized port 24. As either power operator 30 or 34 is energized, flow enters mixing chamber 40 and pressurizes annular chamber 82 thereby moving valve 92 to the right and unseating same from valve seat 88 thereby permitting flow through passage 90 and to high rate outlet port 28. With flow discharging from outlet port 28, and upon energization of solenoid 34, valve member 74 is lifted from valve seat 68 and the fluid pressure in annular chamber 72 is applied to outlet port 24 and also through bypass 102 and 101 to the pressure biased chamber 100. As the fluid pressure builds up in pressure bias chamber 100, diaphragm 94 and valve member 92 move leftward with respect to FIG. 2 causing the valve member 92 to seat upon valve seat 88 thereby blocking flow to the high rate outlet port 28. Thereafter, and so long as solenoid 34 is energized, flow continues to discharge through low rate outlet port 24.

In the present practice of the invention it has been found satisfactory for line pressures in the range of 10–120 psig to have the low rate outlet sized for 0.75 gallons per minute flow and the high rate outlet sized for 3.0 gallons per minute flow rate at a nominal supply pressure. Furthermore, it will be understood that the effective area of diaphragm 94 must be sufficiently greater than the effective area encompassed by valve seat 88 such that sufficient force from fluid in chamber 100 will be available to close valve member 92 on seat 88. In the present practice, it has been found satisfactory to have the diaphragm 94 have an effective area of 0.6013 in.$^2$ and the valve seat 88 to have an effective area of 0.0660 in$^2$ for the above described rates of flow at outlets 24 and 28.

Optionally, a resilient pressure responsive flow control washer 106 may be employed between mixing chamber 40 and the annular chamber 82 to maintain the flow to the high rate outlet port 28 constant with respect to variations in inlet pressure. Similarly, an optional resilient flow control washer 108 may be disposed in a cavity provided in the low rate outlet port 24 for rendering the flow therethrough constant irrespective of variations in the inlet pressure. The details of the resilient flow control washers 106, 108 are well known in the art and require no detailed description herein. However, it has been found that where such resilient flow control washers are employed they should be located as shown in FIG. 2 in order to have proper operation of valve 92.

The present invention thus provides a unique compact valve assembly having only three solenoid operators mounted in a single housing unit and providing for mixing of hot and cold water from separate inlets and discharge upon command at different flow rates to separate discharge outlets. The valve assembly of the present invention utilizes two of the solenoid operated valves for controlling the mixing of the hot and cold inlet water and a single solenoid operated valve upon energization diverts flow from a high rate outlet to a low rate outlet and maintains the flow therethrough so long as the command signal is received.

Upon release of the command signal flow is rediverted to the high rate discharge outlet.

Although the invention has been described hereinabove with respect to particular illustrated embodiments and with respect to the presently preferred practice, it will be understood by those having ordinary skill in the art and the invention is limited only by the following claims.

I claim:

1. A mixing and flow control valve comprising:
   (a) body means including structure defining:
      (i) a fluid mixing chamber;
      (ii) a first fluid inlet passage communicating with said chamber, said passage having an inlet port adapted for connection to a source of unheated fluid, said passage including a first valve seating surface;
      (iii) a second fluid inlet passage communicating with said chamber, said passage having an inlet port adapted for connection to a source of heated fluid, said passage including a second valve seating surface;
      (iv) a first or high rate fluid outlet passage communicating with said mixing chamber and defining a third valve seating surface;
      (v) a second or low rate fluid outlet passage communicating with said mixing chamber and defining a fourth valve seating surface;
   (b) valve means and a movable valve member disposed adjacent each of said first through fourth valve seats, each valve member being movable from a position connecting the respective adjacent valve seats to block fluid flow thereover and a position spaced from the respective adjacent valve seat to permit fluid flow thereover, wherein said valve means adjacent said third valve seat includes pressure responsive means defining, in cooperation with said body means, a pressure bias chamber;
   (c) said body means further defines a bleed passage communicating with said pressure bias chamber directly with said second fluid outlet port;
   (d) individual actuator means connected respectively to each of said first, second and fourth valve means, said actuator means being individually operable upon energization to move the respective individual valve members to a position spaced from its respective valve seat, each of said first, second and fourth actuator means including means operable to bias its respective valve means to the fluid flow preventing position, wherein, upon energization respectively of the valve actuator means for said first, said second or said first and second valve means hot, cold or both hot and cold fluid is delivered to said mixing chamber and, in the absence of energization of said actuator for said fourth valve means, fluid pressure in said mixing chamber causes said pressure responsive means to move said third valve to the flow preventing position and prevent discharge through said first or high rate flow outlet, and upon energization of said actuator means for said third valve means, flow discharges through said second or low rate outlet and the fluid pressure therein is applied to said pressure bias chamber through said bleed passage and the pressure in said bias chamber acts on said pressure responsive member to move said third valve means to contact said third valve seat surface and prevent flow to said first (high rate) outlet.

2. The valve assembly defined in claim 1, wherein said mixing chamber includes pressure responsive flow control means upstream of said third valve seating surface.

3. The valve assembly defined in claim 1, wherein said second (low rate) fluid outlet includes pressure responsive flow control means downstream of said fourth valve seating surface.

4. The valve assembly defined in claim 1, wherein said valve actuator means and said valve means are capable of operating when exposed to inlet pressures in the range of 10–120 psig and for any nominal pressure in said range, said first or low rate outlet is sized to yield substantially 0.75 gallons per minute water flow and said second or high rate outlet yields substantially 3.0 gallons per minute water flow.

5. A mixing and flow control valve comprising:
   (a) body means including structure defining:
      (i) a fluid mixing chamber;
      (ii) a first fluid inlet passage communicating with said chamber, said passage having an inlet port adapted for connection to a source of unheated fluid, said passage including a first valve seating surface;
      (iii) a second fluid inlet passage communicating with said chamber, said passage having an inlet port adapted for connection to a source of heated fluid, said passage including a second valve seating surface;
      (iv) a first fluid outlet passage communicating with said mixing chamber and defining a third valve seating surface;
      (v) a second fluid outlet passage communicating with said mixing chamber and defining a fourth valve seating surface;
   (b) valve means and a movable valve member disposed adjacent each of said first through fourth valve seat, each valve member being movable from a position contacting the respective adjacent valve seat to block fluid flow thereover and a position spaced from the respective adjacent valve seat to permit fluid flow thereover, wherein said valve means adjacent said third valve seat includes pressure responsive means defining, in cooperation with said body means, a pressure bias chamber;
   (c) said body means further defines a bleed passage communicating with said pressure bias chamber directly with said second fluid outlet port;
   (d) individual actuator means connected respectively to each of said first, second and fourth valve means, said actuator means being individually operable upon energization to move the respective individual valve members to a position spaced from its respective valve seat, each of said first, second and fourth actuator means including means operable to bias its respective valve means to the fluid flow preventing position, wherein, upon energization respectively of the valve actuator means for said first, said second or said first and second valve means hot, cold or both hot and cold fluid is delivered to said mixing chamber and, in the absence of energization of said actuator for said fourth valve means, fluid pressure in said mixing chamber causes said pressure responsive means to move said third valve to the flow preventing position and prevent discharge through said first flow outlet, and upon energization of said actuator means for said third valve means, flow discharges through said second outlet and the fluid pressure therein is applied to said pressure bias chamber through said bleed passge and the pressure in said bias chamber acts on said pressure responsive member to move said third valve means to contact said third valve seat surface and prevent flow to said first outlet.

* * * * *